(12) United States Patent
Tsankov et al.

(10) Patent No.: US 12,487,995 B1
(45) Date of Patent: Dec. 2, 2025

(54) SERVICE FOR QUERYING MONITORING DATA

(71) Applicant: Riverbed Technology LLC, Redwood City, CA (US)

(72) Inventors: Desislav I. Tsankov, Wilmington, MA (US); Xiangjing Chen, Perry, MD (US); Andrew Kondrashov, Arlington, MA (US); Andrew Ratin, Newtonville, MA (US)

(73) Assignee: RIVERBED TECHNOLOGY LLC, Redwood City, CA (US)

( * ) Notice: Subject to any disclaimer, the term of this patent is extended or adjusted under 35 U.S.C. 154(b) by 0 days.

(21) Appl. No.: 18/660,586

(22) Filed: May 10, 2024

Related U.S. Application Data

(60) Provisional application No. 63/501,582, filed on May 11, 2023.

(51) Int. Cl.
| | | |
|---|---|---|
| *G06F 16/242* | (2019.01) | |
| *G06F 16/2455* | (2019.01) | |
| *G06F 16/248* | (2019.01) | |
| *G06F 16/25* | (2019.01) | |

(52) U.S. Cl.
CPC .... *G06F 16/2425* (2019.01); *G06F 16/24568* (2019.01); *G06F 16/248* (2019.01); *G06F 16/256* (2019.01)

(58) Field of Classification Search
CPC ........... G06F 16/2425; G06F 16/24568; G06F 16/256; G06F 16/248
See application file for complete search history.

(56) References Cited

U.S. PATENT DOCUMENTS

2018/0248777 A1* 8/2018 Chakra ............... H04L 41/0816

\* cited by examiner

*Primary Examiner* — Truong V Vo
(74) *Attorney, Agent, or Firm* — Laxman Sahasrabuddhe; Park, Vaughan, Fleming & Dowler LLP

(57) ABSTRACT

A first facility may include a data source and an edge service. A second facility may include a first cloud service and a second cloud service. A request may be received at the first cloud service to onboard the data source. A command may be sent from the first cloud service to an edge service to onboard the data source. The edge service may configure the data source to provide monitoring data to the second cloud service through the edge service. A data query may be received at the second cloud service from a client. A set of data queries may be determined based on the data query. A response may be generated based on executing the set of data queries. The response may be provided to the client.

17 Claims, 4 Drawing Sheets

SERVICE FOR QUERYING MONITORING DATA

RELATED APPLICATION

This application claims the benefit of U.S. Provisional Application Ser. No. 63/501,582, filed on 11 May 2023, the contents of which are herein incorporated by reference in their entirety for all purposes.

TECHNICAL FIELD

This disclosure generally relates to computer systems and networks. More specifically, this disclosure relates to a service for querying monitoring data.

BACKGROUND

A computing infrastructure may refer to a collection of computers and networks used by an organization. Numerous objects (which may include, but are not limited to, users, devices, applications, and networks) may be monitored and a variety of metrics may be collected for each monitored object.

SUMMARY

A request may be received to onboard a data source, where the data source may be located at a first facility, and where the request may be received at a first cloud service at a second facility. A command may be sent to an edge service to onboard the data source, where the edge service may be located at the first facility, and where the command may be sent by the first cloud service in response to receiving the request. The data source may be configured to provide monitoring data to a second cloud service, where the data source may be configured by the edge service, and where the monitoring data may be provided by the data source to the second cloud service through the edge service. A data query may be received at the second cloud service from a client. The second cloud service may determine a set of data queries based on the data query, and generate a response based on executing the set of data queries. The response may be provided to the client.

In some embodiments described herein, the first facility may be a cloud service provider facility, and the second facility may be a client premises facility.

In some embodiments described herein, the edge service and the first cloud service may communicate with each other over a secure communication channel.

In some embodiments described herein, the data source may be one of a flow data source, infrastructure data source, packet capture data source, or user device telemetry data source.

In some embodiments described herein, a second data query in the set of data queries may retrieve data from a third cloud service at the second facility. In some embodiments described herein, a third data query in the set of data queries may retrieve data from the data source. In some embodiments described herein, the third data query may be determined based on a response to the second data query.

DETAILED DESCRIPTION

Figure 1:
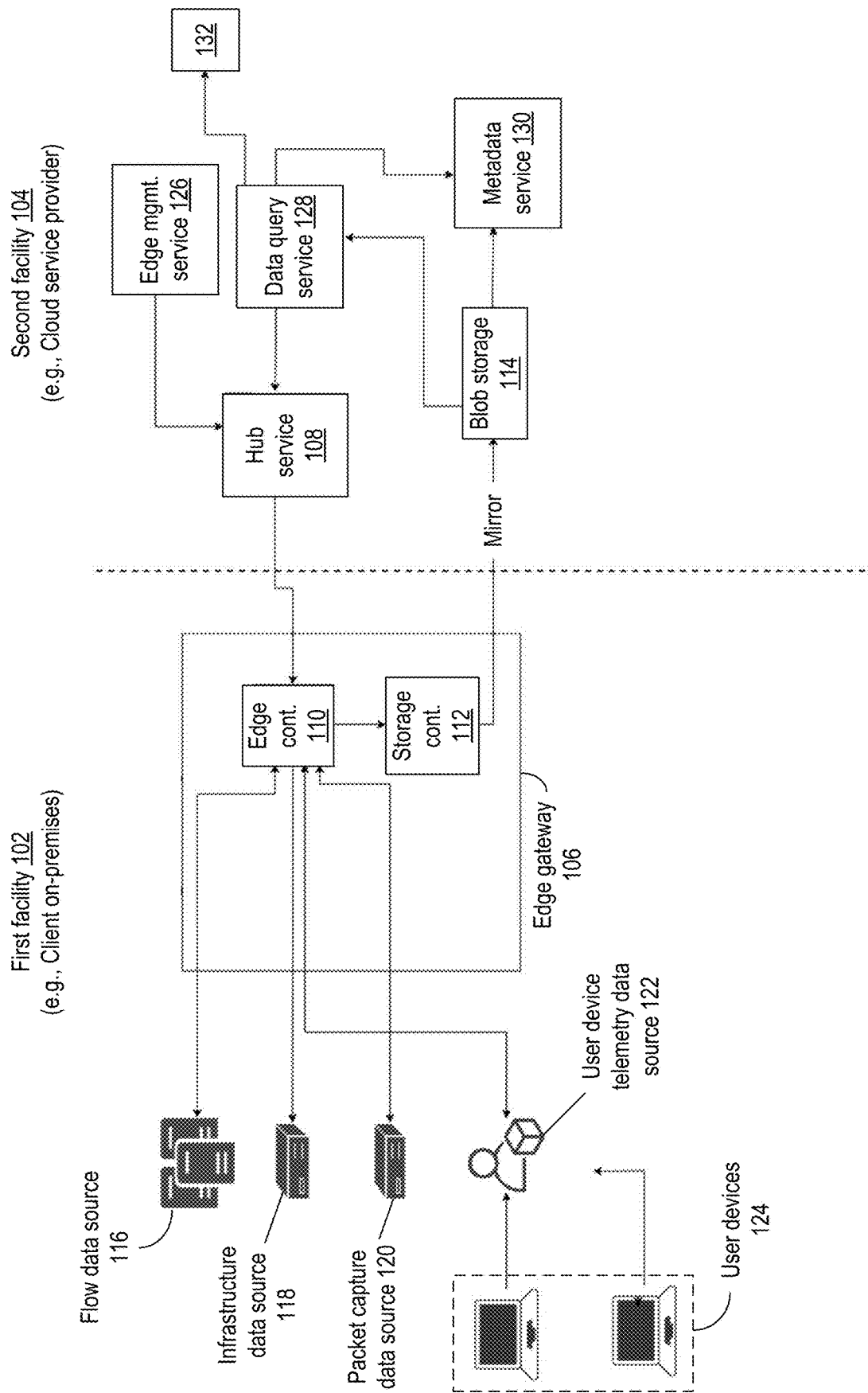
FIG. 1 illustrates a system which supports onboarding of data sources in accordance with some embodiments described herein.

Aspects of the present disclosure relate to a service for querying monitoring data. Objects (which may include, but are not limited to, users, devices, applications, and networks) may be monitored in a computing infrastructure and a variety of metrics may be collected for each monitored object. For example, a monitoring service may consume data from sensors which run in customer networks. The sensors may consume flow data, packet data and poll network endpoints for their status via Simple Network Management Protocol (SNMP) and other discovery protocols. For a given query, a user may not know how to obtain data associated with the query. The term "sensor" may refer to a set of instructions which are executed by a processor, and which implement one or more functions (which may include, but are not limited to, gathering and reporting performance metrics).

Embodiments described herein may provide methods and systems for onboarding data sources and provide methods and systems for generating a response to a data query by retrieving the relevant data across the computing infrastructure. The term "onboarding" may refer to the act of making available or accessible. Embodiments described herein may hide the complexity of obtaining monitoring data across the computing infrastructure.

Technical advantages of embodiments described herein include, but are not limited to, (1) providing a flexible query interface to monitoring data, (2) hiding the complexity of figuring out where the monitoring data is located and how to query and/or retrieve the monitoring data, (3) providing a seamless interface for the monitoring data regardless of whether the monitoring data resides in the cloud or on-premises, and (4) implementing precedence when multiple sources of the monitored data exist.

Examples of computing infrastructures include, but are not limited to, information technology (IT) infrastructures, server farms, and data centers. The term "device" may generally refer to any apparatus that can perform computations and communicate with other devices. In some embodiments, a device can include a processing mechanism that can execute instructions stored on a storage medium. Examples of devices include, but are not limited to, file servers, appliances, routers, switches, smartphones, handheld computers, laptop computers, desktop computers, distributed computers, and printers. The term "network" may refer to multiple interconnected devices. A network can deliver information from one device (e.g., a server) to another device (e.g., a client computer). Examples of networks include, but are not limited to, wireless and wired networks, local area networks (LANs), metropolitan area networks (MANs), WANs, private networks, public networks, intranets, and internets.

Communication between two devices or nodes of a network is typically accomplished using a layered software architecture, which is often referred to as a networking software stack or a networking stack. A given functionality in a networking stack can be implemented using hardware or software or a combination thereof. The decision to implement a specific functionality in hardware or software is typically based on a tradeoff between performance and cost. Each layer in a networking stack may be associated with one or more protocols which define the rules and conventions for processing packets in that layer. Each lower layer may perform a service for the layer immediately above it to help with processing packets, and each layer may add a header (control data) that allows peer layers to communicate with one another. At the sender, each layer may add layer specific headers to the packet as the packet moves from higher layers to lower layers. The receiver may process headers of each layer as the payload moves from the lowest layer to the highest layer.

A data link layer or link layer may refer to a layer that manages a communication channel between adjacent devices in the network. For example, if two routers are connected to each other via a cable, then the link layer may manage the communication channel between these two routers. Ethernet is an example of a link layer. A network layer may refer to a layer that enables communication between any two devices across the network. Internet Protocol (IP) layer is an example of a network layer that enables communication between two routers in an IP network.

Some embodiments described herein may include two components. The first component may setup telemetry streaming so that monitored data may be streamed from data sources and queried on demand from data sources. The second component may implement a flexible query interface which may retrieve the monitoring data and hide the complexity of figuring out where the monitoring data is located and how to query and/or retrieve the monitoring data. Specifically, if a data query can be answered by a service or database that exists in the cloud, then a response to the query may be obtained by querying the appropriate cloud service (s) or database(s). On the other hand, if the query requires obtaining data from a sensor which is in customer network (on-premises), then the data may be obtained from on-premises sensors. If two or more sensors have the same data, then a precedence may be implemented, i.e., embodiments described herein may decide which is the best source for the data. Some embodiments described herein may generate the response by joining data obtained from multiple sensors.

FIG. 1 illustrates a system which supports onboarding of data sources in accordance with some embodiments described herein.

First facility 102 may correspond to an on-premises facility at a client computing infrastructure, and second facility 104 may correspond to a cloud service provider facility. Ordinals (such as "first," "second," etc.) may be used to refer to distinct instances or entities and may not imply an ordering between the instances or entities. For example, the terms "first facility" and "second facility" may refer to distinct facilities but may not necessarily imply an ordering between the facilities. Edge gateway 106 at the first facility 102 may establish a secure communication channel with hub service 108 at the second facility 104. Edge gateway 106 may execute one or more processes, which may include, but are not limited to, edge container 110 and storage container 112. Edge container 110 may communicate with, and may be managed by, hub service 108. The data stored in storage container 112 may be mirrored at blob storage 114 which is located in the second facility 104.

First facility 102 may include multiple data sources (which may be of the same or different types of data sources) which may include, but are not limited to, flow data source 116, infrastructure data source 118, packet capture data source 120, and user telemetry data source 122 (which may obtain telemetry data from user devices 124). Second facility may include multiple services or storages which may include, but are not limited to, edge management service 126, data query service 128, metadata service 130, and cloud monitoring service 132.

Figure 2:
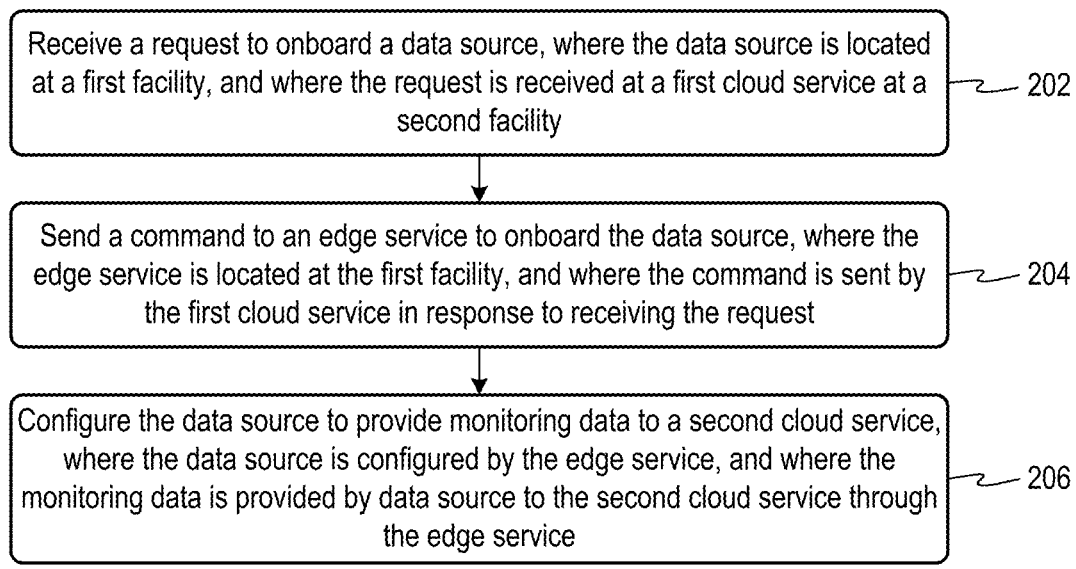
FIG. 2 illustrates a process for onboarding a data source in accordance with some embodiments described herein.

FIG. 2 illustrates a process for onboarding a data source in accordance with some embodiments described herein.

A request to onboard a data source may be received, where the data source may be located at a first facility, and where the request may be received at a first cloud service at a second facility (at 202). For example, in FIG. 1, the request may be received at edge management service 126 via a web interface (not shown in FIG. 1). The request may identify packet capture data source 120 as the data source that is desired to be onboarded.

A command may be sent to an edge service to onboard the data source, where the edge service may be located at the first facility, and where the command may be sent by the first cloud service in response to receiving the request (at 204). For example, in FIG. 1, edge management service 126 may send a command to edge container 110 to onboard packet capture data source 120.

The data source may be configured to provide monitoring data to a second cloud service, where the data source may be configured by the edge service, and where the monitoring data may be provided by the data source to the second cloud service through the edge service (at 206). For example, in FIG. 1, edge container 110 may configure packet capture data source 120 to provide monitoring data to data query service 128. Specifically, packet capture data source 120 may provide the monitoring data to edge container 110, which may store the monitoring data in storage container 112. Storage container 112 may be mirrored with blob storage 114. Thus, whenever data is written to storage container 112, the data may be automatically replicated in blob storage 114. Once the data is replicated in blob storage 114, the data may be deleted from storage container 112 (the data may continue to exist in blob storage 114 after the data is deleted from storage container 112). Data query service 128 may access the data in blob storage 114 to respond to data queries.

In some embodiments described herein, a data source may include a connector module which may communicate with edge container 110. Edge container 110 may configure the data source using the connector module. For example, in FIG. 1, flow data source 116, infrastructure data source 118, packet capture data source 120, and user device telemetry data source 122 may each include a connector module. The term "connector module" may refer to a set of instructions which may be executed by a processor. A connector module may expose an application programming interface (API) which may be used to configure the connector module. Specifically, in some embodiments described herein, the API may be a REST API, which may conform to the REST architectural constraints. In some embodiments described herein, the REST API may be implemented using Hypertext Transfer Protocol (HTTP). Once a connector module of a data source is configured (which may include providing secure credentials to the connector module to communicate with edge container 110), the connector module may push telemetry data from the data source to edge container 110.

Figure 3:
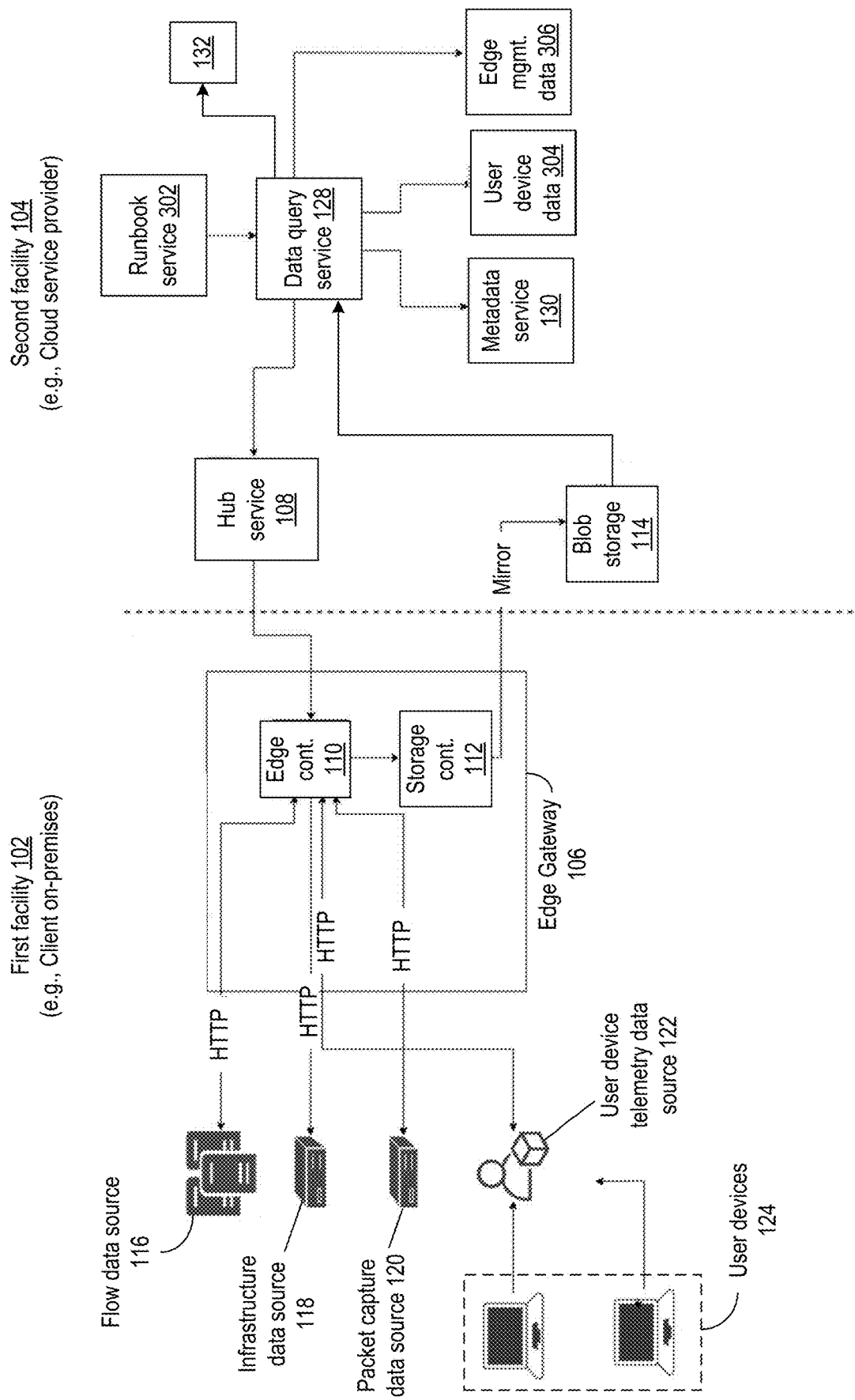
FIG. 3 illustrates a system which supports on-demand data queries in accordance with some embodiments described herein.

FIG. 3 illustrates a system which supports on-demand data queries in accordance with some embodiments described herein.

As shown in FIG. 3, first facility 102 may correspond to an on-premises facility at a client computing infrastructure, and second facility 104 may correspond to a cloud service provider facility. First facility 102 may include edge gateway 106 (which may include edge container 110 and storage container 112), flow data source 116, infrastructure data source 118, packet capture data source 120, and user telemetry data source 122 (which may obtain telemetry data from user devices 124). Second facility may include multiple services or storages which may include, but are not limited to, hub service 108, data query service 128, metadata service 130, and cloud monitoring service 132. In addition, to support data queries, the second facility 104 may include runbook service 302, user device data 304 (which may be stored on a storage device), and edge management data 306 (which may be stored on a storage device).

Figure 4:
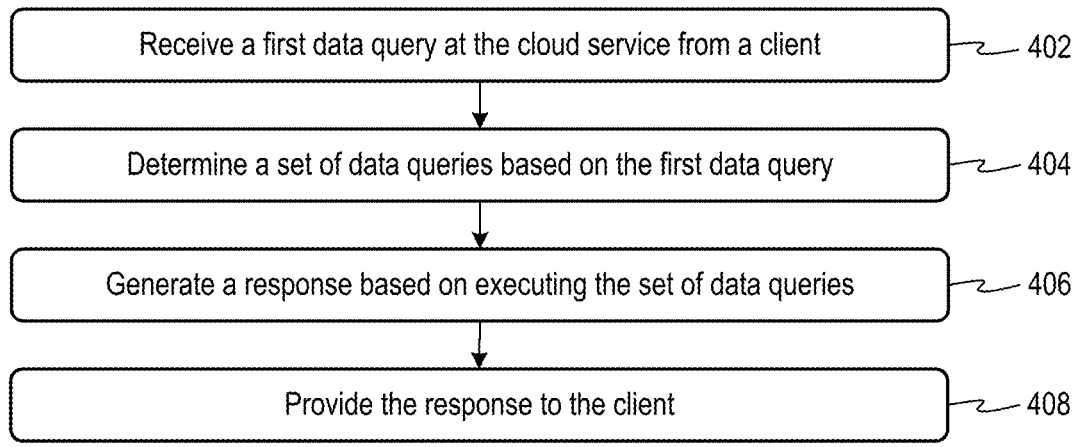
FIG. 4 illustrates a process for providing an on-demand query service in accordance with some embodiments described herein.

FIG. 4 illustrates a process for providing an on-demand query service in accordance with some embodiments described herein.

A first data query may be received at the cloud service from a client (at 402). For example, in FIG. 3, runbook service 302 may include a set of rules and processes for responding to an anomalous event in the computing infrastructure. When certain criteria are met, runbook service 302 may execute a sequence of queries as per the business logic implemented in the runbook service 302. Specifically, data query service 128 may receive a first query from the runbook service 302. In this example, the runbook service 302 is a client with respect to the data query service 128. In general, the term "client" may generally refer to any system which sends a query to data query service 128.

A set of data queries may be determined based on the first data query (at 404). Specifically, the data query service 128 may be responsible for providing a flexible query interface to runbook service 302. Data query service 128 may hide the complexity of figuring out where the data is and how to query it. If the first query can be answered by services or databases in the second facility 104, then data query service 128 may obtain the data by querying the appropriate services or looking up the data in the appropriate databases. For example, if the first query can be answered by metadata service 130, or cloud monitoring service 132, or looked up in blob storage 114, user device data 304 or edge management data 306, then the set of queries determined by data query service 128 may include queries to entities located in the second facility 104 and may not require contacting entities located in first facility 102.

On the other hand, if the first query requires getting data from a data source which is located at the first facility, then data query service 128 may send a request or command to edge container 110. Edge container 110 may then use the API of the data sources to gather the response data. In some embodiments described herein, edge container 110 may make HTTP POST/GET calls to the connector modules in the appropriate data sources to gather the response data.

A response may be generated based on executing the set of data queries (at 406). Specifically, the response data received form multiple sources may be joined and/or otherwise merged to generate a combined response. The response may then be provided to the client (at 408). For example, a single query from runbook service 302 may be answered by getting data from flow data source 116, infrastructure data source 118, and packet capture data source 120, and then joining the response data from the different sources into a single response. Some embodiments described herein may use caching to provide better performance. Each data source may, by itself, have a data lake with petabytes of data and a computing infrastructure may include hundreds of data sources spread across the globe.

As an example, suppose a customer is experiencing a network issue in their Tokyo branch. The customer would like to understand what infrastructure exists in Tokyo and get vital metrics about the devices there. If the embodiments described herein were not used, then the customer would have to first understand which sensors have coverage for Tokyo infrastructure and traffic. Then, the customer would have to log into each of the sensors, run reports on each of the sensors, and look at the individual views provided by the sensors and then merge the data together in their head. Instead, embodiments described herein can achieve this task for the customer by executing a single request.

Specifically, in this example, data query service 128 may dispatch requests to metadata service 130, and one or more data sources located at the first facility 102 (these requests may be communicated through hub service 108). Metadata service 130 may provide a list of all devices that are in the Tokyo branch (which in this example is assumed to be the first facility 102). The list of devices may be sent to flow data source 116 (e.g., the list may be included in a request or command that is sent to flow data source 116 via hub service 108 and edge container 110). Specifically, edge container 110 may obtain flow data from flow data source 116 via single API request/response which may be sent over an HTTP connection. The device status, the up time, and the sum of recent configuration changes may be requested from infrastructure data source 118 via three separate API request/responses which may be performed in parallel over HTTP connections. If the devices are spread in different regions (e.g., in multiple on-premises facilities across the globe), then data query service 128 may contact the infrastructure data sources in the different facilities. Once all responses are received, then the responses may be merged and returned in a single response.

To reiterate, requiring the customer to individually query sensor products assumes that the customer has inherent knowledge of the data models and data sets of each sensor, as well as deployment model of the sensors in the customer environment. However, may be a few customers or none of the customers may have such knowledge. Embodiments described herein do not require the customer to first select a particular sensor product and then ask questions using its interface. In embodiments described herein, the customer does not have to know anything about individual data lakes and their deployment and instead is able to ask questions in a holistic way across the entire infrastructure.

Sometimes more than one sensor, often of different data types may need to be accessed and the data may be joined in complex ways. For example, if a customer wants to understand the health of devices along the delivery path of an application to a business site, they will first need to find the best flow-based sensor that receives data from the devices along the path, based on the flows between the application servers and the clients located at the site, for the given application. The request to that sensor would return a list of network devices in the path. Then, one would need to go over the list of the network devices, and for each one, determine which infrastructure sensor has information about the health of this particular device and then request health data from the appropriate sensor. This could be thought of as a complex, two-stage "join", but it is easy to see how it's quite different from a simple data base join, since there is a lot of programmatic logic in between stages. Embodiments described herein (e.g., data query service 128 in FIG. 3) understand the underlying sensor object models, deployment topology, and object ownership in a customer environment, and can provide a response to a customer query. Thus, embodiments described herein do not require the customer to know or understand the complexities of the infrastructure.

Consider the example in which the customer was experiencing a network issue in the Tokyo branch. In this example, the customer may use any one of three possible queries (among many other possibilities). All three possible queries may generate the same response or similar responses. One possible query (hereinafter referred to as Q1) may be represented as follows:

```
{
    "obj_type": "network_device.performance",
    "time_series": false,
    "metrics": [
        "throughput",
        "active_connections",
        "device_status",
        "device_up_time",
        "sum_changes"
    ]
    "limit": 5,
    "top_by": [{"id": "throughput", "direction": "desc"}],
    "filters": {
        "physical_location": [{
            "name": "Branch Tokyo"
        }]
    }
}
```

Specifically, the query requests that a set of metrics including the throughput, active connections, device status, device uptime, and the sum of the device changes should be reported for devices in the Tokyo branch. The query may further specify that top five devices by throughput should be reported. The same query may also be provided by specifically listing the network devices. Specifically, rather than working with all devices in the Tokyo branch, which can be thousands and may overburden the user, a small list of devices which are at fault (reported as down/or rebooted) may be included in the request. For example, another possible query (hereinafter referred to as Q2) may be represented as follows:

```
{
    "obj_type": "network_device.performance",
    "time_series": false,
    "metrics": [
        "throughput",
        "active_connections",
        "device_status",
        "device_up_time",
        "sum_changes"
    ],
    "top_by": [{"id": "device_status", "direction": "desc"}],
    "filters": {
        "network_devices": [{
            "ipaddr": "10.5.97.77"
        }, {
            "ipaddr": "10.5.97.78"
        }, {
            "ipaddr": "10.5.97.72"
        }]
    }
}
```

In Q2, the IP addresses of the problematic network devices are explicitly listed. Alternatively, the request may explicitly specify a list of network interfaces which are believed to be at fault. For example, these network devices may have been reported as having too many packet errors or discards, or the percentage utilization exceeds a threshold (such as 95%). Thus, yet another possible query (hereinafter referred to as Q3) may be represented as follows:

```
{
    "obj_type": "network_device.performance",
    "time_series": false,
    "metrics": [
        "throughput",
        "active_connections"
        "device_status",
        "device_up_time",
        "sum_changes"
    ],
    "top_by": [{"id": "device_status", "direction": "desc"}],
    "filters": {
        "network_interfaces": [{
            "ipaddr": "10.5.97.77", "ifindex": 20
        }, {
            "ipaddr": "10.5.97.78", "ifindex": 10
        }, {
            "ipaddr": "10.5.97.72", "ifindex": 32
        }]
    }
}
```

The three queries Q1, Q2, and Q3 may generate the following response (or similar responses):

```
{
    "data": [{
        "data": {
            "throughput": 20034113.22,
            "active_connections": 233,
            "device_up_time": 3619,
            "sum_changes": 0,
            "device_status": "Up"
        },
        "keys": {
            "network_device.ipaddr": "10.5.97.77",
            "network_device.name": "oak-vcs164",
            "network_device.location.name": "Branch_Tokyo",
            "network_device.serial_number": "FTX0924A1FF",
            "network_device.os_version": "12.4(25c)",
            "network_device.model": "Cisco 2821",
            "network_device.type": "Router",
            "network_device.vendor": "Cisco Systems",
            "network_device.is_gateway": false
        }
    },
    {
        "data": {
            "throughput": 10134112.83,
            "active_connections": 29,
            "device_up_time": 45009334,
            "sum_changes": 0,
            "device_status": "Up"
        },
        "keys": {
            "network_device.ipaddr": "10.5.97.78",
            "network_device.name": "oak-vcs165",
```

```
        "network_device.location.name":
"Branch_Tokyo",
      "network_device.serial_number": null,
           "network_device.os_version":
null,
           "network_device.model":
"Linux Host",
           "network_device.type":
"Host",
           "network_device.vendor":
"Linux",
           "network_device.is_gateway":
false
      }
    },
    {
       "data": {
          "throughput": 132406.39,
          "active_connections": 341,
          "device_up_time": 128032220,
          "sum_changes": 0,
          "device_status": "Up"
       },
       "keys": {
          "network_device.ipaddr":
"10.5.97.72",
           "network_device.name": "oak-
vtcl",
       "network_device.location.name":
"Branch_Tokyo",
      "network_device.serial_number": null,
           "network_device.os_version":
null,
           "network_device.model":
"Linux Host",
           "network_device.type":
"Host",
           "network_device.vendor":
"Linux",
           "network_device.is_gateway":
false
      }
    },
    {
       "data": {
          "throughput": 112806.91,
          "active_connections": 18,
          "device_up_time": 65,
          "sum_changes": 0,
          "device_status": "Up"
"Flapping/Up"
       },
       "keys": {
          "network_device.ipaddr":
"10.5.97.73" ,
           "network_device.name": "oak-
vcs888",
       "network_device.location.name":
"Branch_Tokyo",
      "network_device.serial_number": null,
           "network_device.os_version":
null,
           "network_device.model":
"Microsoft Workstation",
           "network_device.type":
"Host",
           "network_device.vendor":
"Microsoft Systems",
           "network_device.is_gateway":
false
      }
    },
    {
       "data": {
          "throughput": 82732.47,
          "active_connections": 8,
          "device_up_time": 200981764,
          "sum_changes": 2,
          "device_status": "Up"
      },
       "keys": {
          "network_device.ipaddr":
"10.5.97.71",
           "network_device.name": "oak-
vcs884",
       "network_device.location.name":
"Branch_Tokyo",
      "network_device.serial_number": null,
           "network_device.os_version":
null,
           "network_device.model":
"Linux Host",
           "network_device.type":
"Host",
           "network_device.vendor":
"Linux",
           "network_device.is_gateway":
true
       }
     }
  ]
}
```

As shown above, the data for all devices is merged into a single response. Additionally, the data for a single device may be obtained from multiple data sources, and is joined so that the data for a single device is presented in a single data unit. For example, the response indicates that device with IP address 10.5.97.77 has the serial number FTX0924A1FF and has a throughput of 20034113.22. Additionally, the response provides details of the active connections, device up time, the device model, type, operating system version, and so forth. These different types of data may be obtained from different data sources. For example, the throughput may be obtained from flow data source 116, whereas the model and the operating system version may be obtained from infrastructure data source 118.

The queries (Q1, Q2, or Q3) may be handled by the system shown in FIG. 3 as follows. Data query service 128 may request metadata service 130 to provide a list of network device objects and all their properties (serial #, name, version, vendor, etc.) based on the information in the query. Data query service 128 may divide the list of network device objects into lists per product. Next, data query service 128 may send a first set of queries (the first query stage) to infrastructure data source 118 based on the devices they know about (i.e., data query service 128 may send the queries to different infrastructure data source depending on which devices each infrastructure data source covers).

Responses from the different infrastructure data sources may be received by data query service 128, and the responses may be merged. Each response may contain time-series data, which may be further summarized. If a device status changes from UP to DOWN more than once, then data query service 128 may indicate the device as having a flapping state. If the last state of a device is DOWN then the state associated with the device may be set to Flapping (Down). On the other hand, if the latest state is UP, then the state may be set as Flapping (Up). The list of devices may be ordered by the worst status, e.g., in the following order-Down, Flapping (Down), Flapping (Up), Up, and Unknown. The Unknown status is possible when the data source cannot return the state, e.g., the device cannot be polled via SNMP, or if the device is known to NetFlow data source and it's not configured on the SNMP polling data source. In some embodiments described herein, a limit may be imposed on the number of devices for which data is gathered (e.g., if the list is larger than 100, then only the first 100 devices may be used).

Data query service 128 may then send a second set of queries (i.e., the second query stage) to all data sources. For example, in this stage, the flow data source 118 may be queried for throughput and active connections information, while SNMP data sources may be queried for uptime and number of configuration changes. If the data source (e.g., current version of SNMP data source) cannot handle uptime and configuration changes in single query, then each data source may be queried twice (such idiosyncratic details are hidden from the user). If the original request which was received by data query service 128 included a request to provide comparison data, then data query service 128 may send out another round of queries for a different timeframe, e.g., the same data for yesterday or a week ago. Once all response data is obtained, the information may be merged and formatted into a single response and provided to the client.

Figure 5:
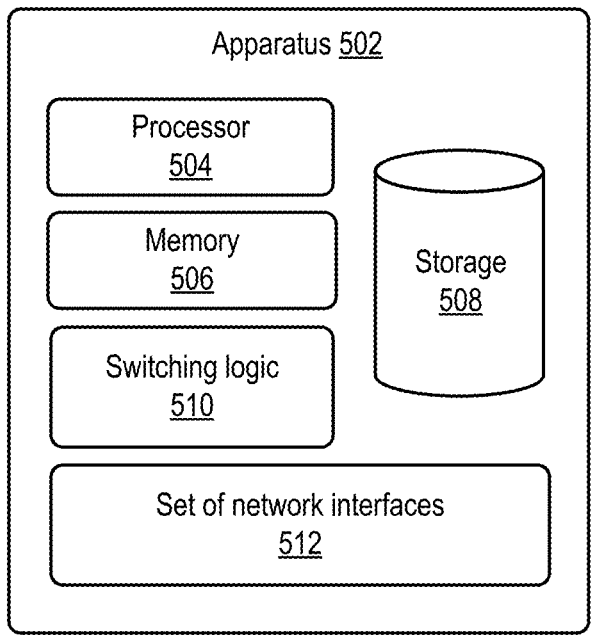
FIG. 5 illustrates an apparatus in accordance with some embodiments described herein.

FIG. 5 illustrates an apparatus in accordance with some embodiments described herein.

Apparatus 502 (e.g., a device, a file server, etc.) can include processor 504, memory 506 (e.g., a volatile or non-volatile random access memory), and storage 508 (e.g., a flash memory device or a disk drive). Storage 508 can store data and executable code. The components in apparatus 502 can communicate with one another using a communication mechanism (not shown in FIG. 5), e.g., a bus, a backplane, and/or a switching fabric. Executable code stored in storage 508 can include instructions that, when executed by processor 504, cause apparatus 502 to perform one or more methods that are implicitly or explicitly described in this disclosure. Storage 508 can also store any data that is required by any processes that are performed by apparatus 502.

Apparatus 502 can also include switching logic 510 and set of network interfaces 512. Set of network interfaces 512 can be used to transmit data to and/or receive data from other communication devices. Switching logic 510 can forward network traffic received on one or more network interfaces in accordance with switching/forwarding/routing information stored in apparatus 502. Specifically, switching logic 510 can be configured by processor 504 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
  receiving a request to onboard a data source, wherein the data source is located at a first facility, and wherein the request is received at a first cloud service at a second facility;
  sending a command to an edge service to onboard the data source, wherein the edge service is located at the first facility, and wherein the command is sent by the first cloud service in response to receiving the request;
  configuring the data source to provide monitoring data to a second cloud service, wherein the data source is configured by the edge service, wherein the data source provides the monitoring data to the edge service, wherein the edge service stores the monitoring data in a first storage located at the first facility, wherein the first storage is mirrored with a second storage located at the second facility, and wherein the second cloud service accesses the monitored data stored in the second storage;
  receiving a first data query at the second cloud service from a client;
  determining, by the second cloud service, a set of data queries based on the first data query;
  generating, by the second cloud service, a response based on executing the set of data queries; and
  providing, by a processor, the response to the client.

2. The method of claim 1, wherein the first facility is a cloud service provider facility, and the second facility is a client premises facility.

3. The method of claim 1, wherein the edge service and the first cloud service communicate with each other over a secure communication channel.

4. The method of claim 1, wherein the data source is one of a flow data source, infrastructure data source, packet capture data source, or user device telemetry data source.

5. The method of claim 1, wherein a second data query in the set of data queries retrieves data from a third cloud service at the second facility.

6. The method of claim 5, wherein a third data query in the set of data queries retrieves data from the data source.

7. The method of claim 6, wherein the third data query is determined based on a response to the second data query.

8. A non-transitory computer-readable medium comprising stored instructions, which when executed by a respective processor, cause the respective processor to:
  receive a request to onboard a data source, wherein the data source is located at a first facility, and wherein the request is received at a first cloud service at a second facility;

send a command to an edge service to onboard the data source, wherein the edge service is located at the first facility, and wherein the command is sent by the first cloud service in response to receiving the request;

configure the data source to provide monitoring data to a second cloud service, wherein the data source is configured by the edge service, and wherein the monitoring data is provided by the data source to the second cloud service through the edge service;

receive a first data query at the second cloud service from a client;

determine, by the second cloud service, a set of data queries based on the first data query, wherein a second data query in the set of data queries retrieves data from a third cloud service at the second facility, wherein a third data query in the set of data queries retrieves data from the data source, and wherein the third data query is determined based on a response to the second data query;

generate, by the second cloud service, a response based on executing the set of data queries; and provide the response to the client.

9. The non-transitory computer-readable medium of claim 8, wherein the first facility is a cloud service provider facility, and the second facility is a client premises facility.

10. The non-transitory computer-readable medium of claim 8, wherein the edge service and the first cloud service communicate with each other over a secure communication channel.

11. The non-transitory computer-readable medium of claim 8, wherein the data source is one of a flow data source, infrastructure data source, packet capture data source, or user device telemetry data source.

12. A system, comprising:
a set of memories storing instructions; and
a set of processors, coupled with the set of memories, and to execute the instructions, the instructions when executed causing the set of processors to:
receive a request to onboard a data source, wherein the data source is located at a first facility, wherein the request is received at a first cloud service at a second facility, and wherein the data source is one of a flow data source, infrastructure data source, packet capture data source, or user device telemetry data source;

send a command to an edge service to onboard the data source, wherein the edge service is located at the first facility, and wherein the command is sent by the first cloud service in response to receiving the request;

configure the data source to provide monitoring data to a second cloud service, wherein the data source is configured by the edge service, and wherein the monitoring data is provided by the data source to the second cloud service through the edge service, wherein the data source provides the monitoring data to the edge service, wherein the edge service stores the monitoring data in a first storage located at the first facility, wherein the first storage is mirrored with a second storage located at the second facility, and wherein the second cloud service accesses the monitored data stored in the second storage;

receive a first data query at the second cloud service from a client;

determine, by the second cloud service, a set of data queries based on the first data query;

generate, by the second cloud service, a response based on executing the set of data queries; and provide the response to the client.

13. The system of claim 12, wherein the first facility is a cloud service provider facility, and the second facility is a client premises facility.

14. The system of claim 12, wherein the edge service and the first cloud service communicate with each other over a secure communication channel.

15. The system of claim 12, wherein a second data query in the set of data queries retrieves data from a third cloud service at the second facility.

16. The system of claim 15, wherein a third data query in the set of data queries retrieves data from the data source.

17. The system of claim 16, wherein the third data query is determined based on a response to the second data query.

* * * * *